UNITED STATES PATENT OFFICE.

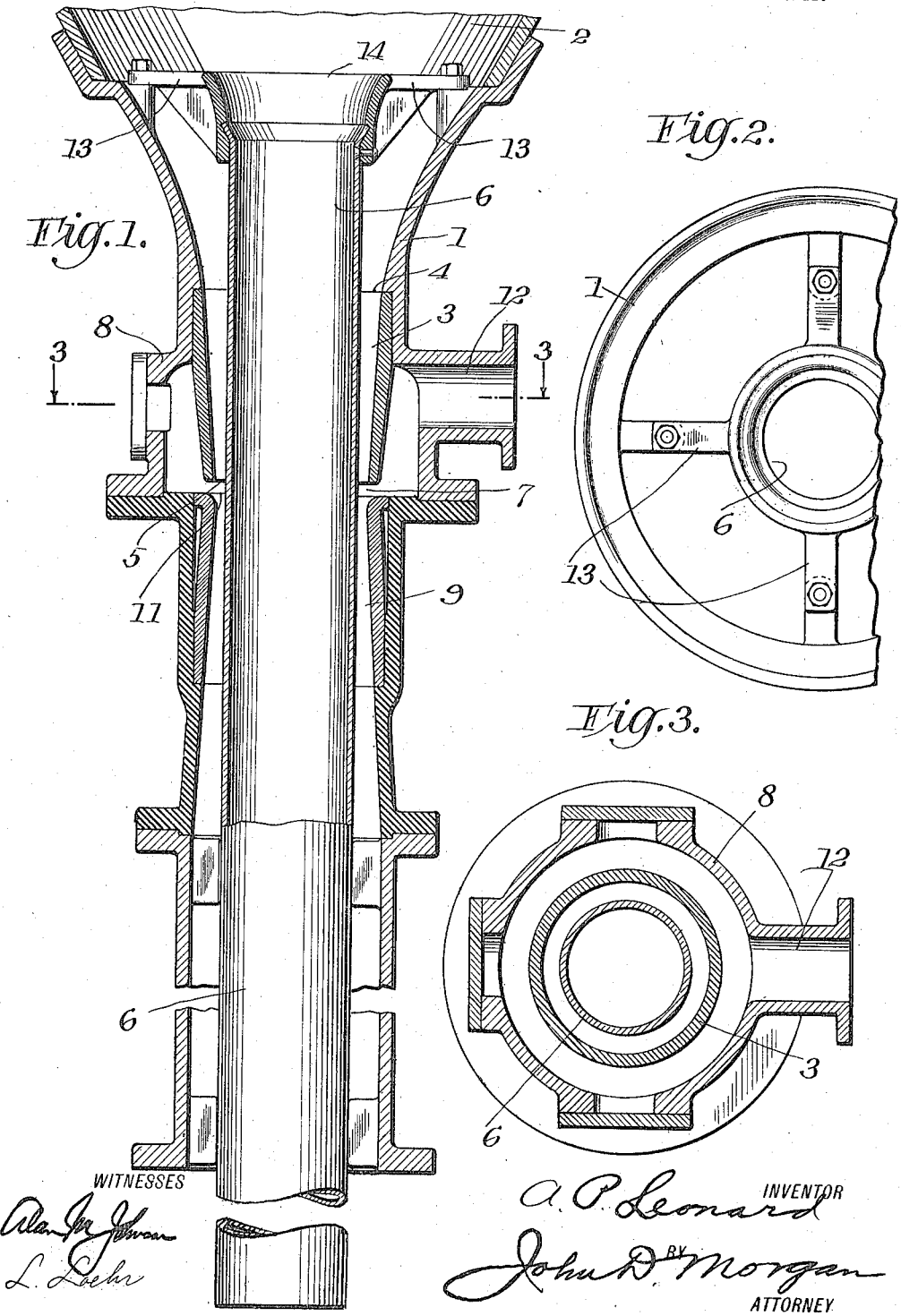

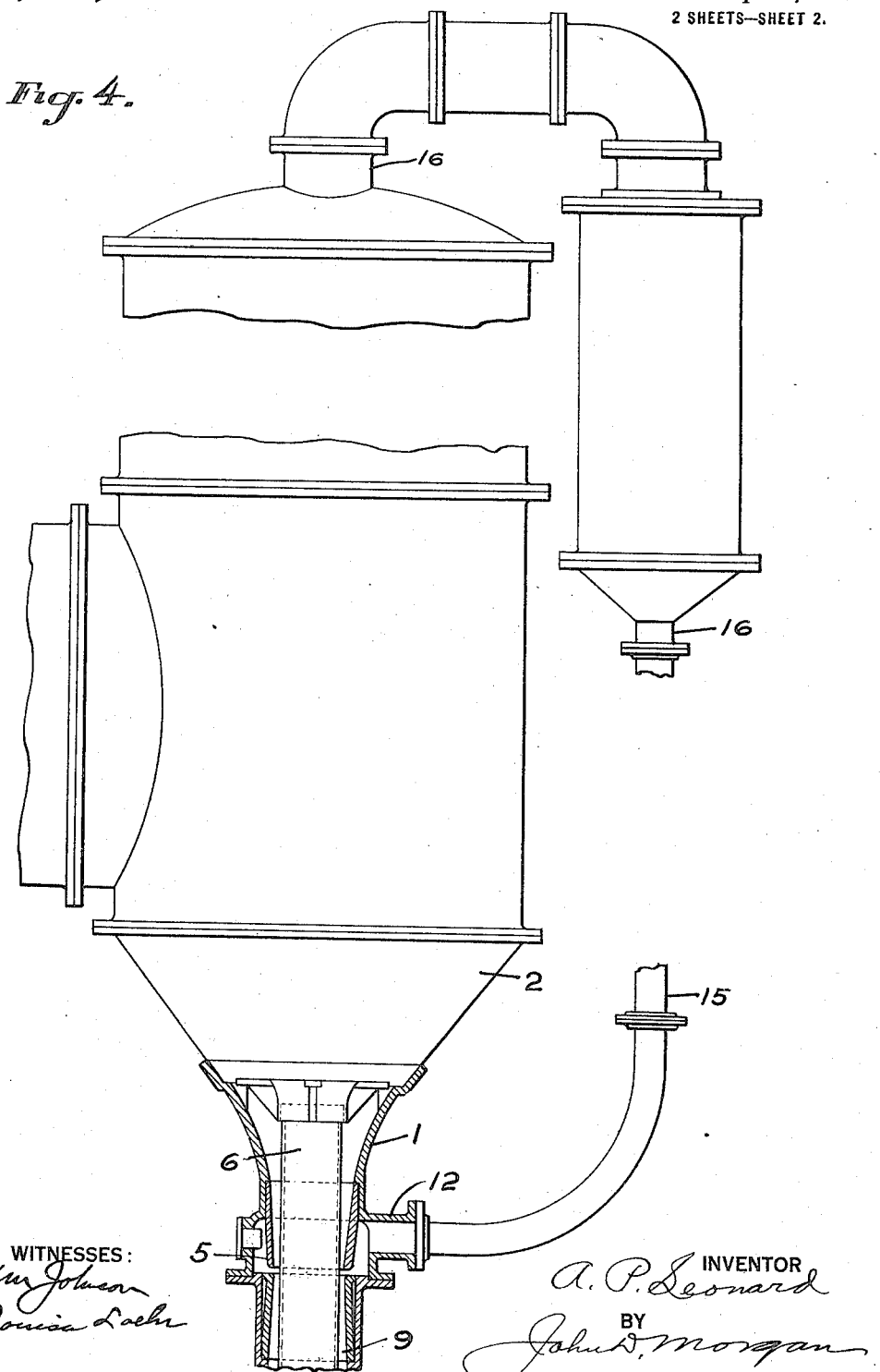

ALBERT P. LEONARD, OF NEW YORK, N. Y., ASSIGNOR TO HONOLULU IRON WORKS COMPANY, A CORPORATION OF HAWAII.

ASPIRATOR.

1,221,463.   Specification of Letters Patent.   Patented Apr. 3, 1917.

Application filed November 30, 1914. Serial No. 874,613.

*To all whom it may concern:*

Be it known that I, ALBERT P. LEONARD, a citizen of the United States, and a resident of New York, in the county of New York and State of New York, have invented new and useful Improvements in Aspirators, of which the following is a specification.

The invention relates to aspirators, and in certain aspects thereof more particularly to aspirators adaptable to drawing the air and non-condensable gases from condensers and the like, the aspirator utilizing for this purpose the waste or discharged condenser water.

The objects and advantages of the invention will be set forth hereinafter in part, and in part will be obvious herefrom, the same being attained through the means pointed out in the appended claims.

The invention consists in the novel parts, constructions, arrangements, combinations and improvements herein shown and described.

The accompanying drawings referred to herein, and constituting a part hereof illustrate one embodiment of the invention, and together with the description, serve to explain the principles thereof.

Of the drawings:—

Figure 1 is a central vertical section through a device embodying the invention;

Fig. 2 is a fragmentary top plan corresponding to Fig. 1; and

Fig. 3 is a horizontal section on line 3—3 of Fig. 1.

Fig. 4 is a diagrammatic view of a condenser and connections therefrom.

In the usual type of aspirator without means of by-passing the water from the condenser, and in various other structures, a reasonable degree of efficiency and of satisfactory operation is attained where the outflow of the condensing water is constant. In many such devices, however, it is necessary to very greatly vary the water flow in the condenser, as by setting a water inlet valve, either to take care of varying quantities of incoming steam to be condensed, or as in the case of vacuum pans for sugar production, to change the vacuum or "heat" in the apparatus. As an illustration of such variations occurring in the manufacture of sugar, if it be assumed that the temperature of the condensing water is constant at about 85° F, the weight of water passing down the fall pipe will decrease from 72 pounds to 26 pounds per pound of steam condensed in reducing the vacuum from 28 to 26 inches of mercury.

By means of my invention I am enabled to maintain the velocity and volume of the condensing water used by the aspirator substantially constant for all variations in the quantity of water used to meet the various conditions and requirements of condensing, thereby maintaing a uniform suction on the air and gas inlet. This is accomplished, in accordance with one feature of the invention, by designing the throat area for the minimum quantity of water required in regular working for condensing the vapors from the vacuum pans, or other chambers, and at the same time automatically taking care of all surplusage of water required for the condensing, without any valve setting or any thought or calculation on the part of the workmen. This also acts to effect a saving of water, as it is not necessary at any time to use more water than is required to condense the steam in order to maintain the proper water velocity in the aspirator. In changing the "heat" or vacuum on the pan, it is only necessary to alter the setting of the water inlet valve in accordance with the changed or changing requirements of the condenser. No "juggling" or correlating between the water valve and air outlet valve is required.

Referring now more particularly to the present embodiment, an outer pipe or casing 1 which may be called the fall pipe is suitably connected to receive the outflow of condensing water, and for this purpose it may be joined at its top to the bottom 2 of a condenser. The fall pipe 1 at a relatively short distance below its upper end is provided with a contracted throat formed by a ring or member 3 in the form of an inverted hollow frustum of a cone with its upper edge 4 fitting closely and smoothly into the walls of the fall pipe 1, and with its lower edge 5 forming a contracted throat about an internal overflow pipe 6. The overflow pipe has its upper end or intake at a point above said throat.

The air and incondensable gas inlet 7 is of annular form and circumjacent the contracted outlet of the throat 5, and is formed by a casing 8 encircling the member 3 so as to give free passage thereabout to the air and vapors which are drawn in through the annular inlet 7 by the water flow. The space within the casing 8 is inclosed at the bottom by a horizontal annular flange or shelf attached to or formed upon the fall pipe 1 and extending inwardly to form the lower part of casing 8 and the lower edge 11 of the air and gas inlet 7. From just below the throat 5 and air and gas inlet 7, a flanged and somewhat conically shaped pipe member 9 expands or increases in diameter downwardly to the full size of the fall pipe 1 again. The pipe 1 is shown in sections for convenience in manufacture and in assembling. The space within the casing 8 communicates by means of a pipe 12 with a pipe 15 leading to the air outlet 16 of the condenser or other chamber to be exhausted. The overflow pipe 6 is held in position in a suitable manner within the fall pipe 1, as by means of spiders or struts 13.

In the operation of the device, the throat 5 is full of water under the minimum requirements of the condenser but producing sufficient suction or aspirating action to draw off all the air and gases, the velocity of the water at the throat being constant under the head maintained. As the quantity of water increases to meet varying requirements in the work of condensing, it backs up in the upper portion of the fall pipe and on reaching the top 14 of the overflow pipe 6, it flows downwardly within the overflow pipe 6 without in anywise affecting the aspirating action and requiring no attention from the attendant.

From all the foregoing it will be understood that a device has been provided which realizes the objects and advantages herein set forth, together with other objects and advantages.

It will be further understood that certain changes in construction and arrangements may be made from the precise form herein shown and described without departing from the principles of the invention and without sacrificing its chief advantages.

What I claim as my invention and desire to secure by Letters Patent is:—

1. An aspirator including in combination a fall pipe receiving the condenser water, a contracted throat in the fall pipe, an air and gas inlet opening into the fall pipe adjacent to the throat, and an overflow pipe within the fall pipe with its intake above the throat.

2. An aspirator including in combination a fall pipe receiving the condenser water, an annular throat within the fall pipe, an annular air and gas inlet opening into the fall pipe about said throat, and an overflow pipe within the fall pipe and having its intake above the throat.

3. An hydraulic aspirator including in combination a pipe with a contracted throat, a gas inlet adjacent thereto, and an overflow pipe within, and having its intake above, said contracted throat.

4. In combination with a condenser, a fall pipe receiving the condenser water therefrom, a contracted throat in the fall pipe below the condenser, an air and gas inlet opening into the fall pipe adjacent to the throat, and a pipe supplying the air and gases to said inlet, said pipe being adapted to communicate with the air outlet of the condenser, and means for carrying away any surplus water from said throat.

5. In combination with a condenser, a fall pipe receiving the condenser water therefrom, a contracted throat in the fall pipe below the condenser, an air and gas inlet opening into the fall pipe adjacent to the throat, and means within said pipe at said throat for diminishing the area at that point and conducting away any surplus water from said throat, and a pipe supplying the air and gases to said inlet, said pipe being adapted to communicate with the air outlet of the condenser.

6. In combination with a condenser, a fall pipe receiving the condenser water therefrom, a contracted throat in the fall pipe below the condenser, an air and gas inlet opening into the fall pipe adjacent to the throat, and an overflow pipe within the fall pipe with its intake above said throat, and a pipe supplying the air and gases to said inlet, said pipe being adapted to communicate with the air outlet of the condenser.

In testimony whereof, I have signed my name to this specification, in the presence of two subscribing witnesses.

ALBERT P. LEONARD.

Witnesses:
  JOHN D. MORGAN,
  LOUISA LOEHR.

Copies of this patent may be obtained for five cents each, by addressing the "Commissioner of Patents, Washington, D. C."